(12) United States Patent
Rau

(10) Patent No.: US 6,741,277 B1
(45) Date of Patent: May 25, 2004

(54) SYSTEM AND METHOD FOR AUTOMATED TESTING OF DIGITAL TELEVISION RECEIVERS

(75) Inventor: Arun N. Rau, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 559 days.

(21) Appl. No.: 09/591,826

(22) Filed: Jun. 12, 2000

Related U.S. Application Data

(60) Provisional application No. 60/176,073, filed on Jan. 13, 2000.

(51) Int. Cl.$^7$ .......................... H04N 17/02; H04N 17/00
(52) U.S. Cl. .......................... 348/181; 348/184; 348/189
(58) Field of Search ................................. 348/181, 180, 348/184, 189, 191, 192, 193, 497; 702/108; 714/724; H04N 17/00, 17/02

(56) References Cited

U.S. PATENT DOCUMENTS

| 4,158,857 A | | 6/1979 | Hiraguri | ...................... 358/139 |
| 5,274,445 A | * | 12/1993 | Overton et al. | ............. 348/181 |
| 5,384,849 A | | 1/1995 | Jeong | ........................... 380/49 |
| 5,966,186 A | | 10/1999 | Shigihara et al. | ........... 348/570 |
| 6,057,882 A | * | 5/2000 | van den Branden Lambrecht et al. | ........................... 348/192 |
| 6,400,400 B1 | * | 6/2002 | Isnardi et al. | ............... 348/180 |

FOREIGN PATENT DOCUMENTS

| GB | 2202706 A | | 9/1988 |
| JP | 404038095 | * | 2/1992 |
| WO | 9212600 A1 | | 7/1992 |

* cited by examiner

Primary Examiner—Sherrie Hsia
(74) Attorney, Agent, or Firm—Laurie E. Gathman

(57) ABSTRACT

There is disclosed a system and method for the automated testing of digital television receivers. The automated test system comprises a digital video signal unit capable of sending a digital video test pattern to a digital television receiver. The digital video signal unit is capable of receiving from the digital television receiver a reconstructed digital video signal representing the digital video test pattern as displayed by the digital receiver television receiver. The automated test system comprises a test processing unit that is capable of comparing the digital video test pattern with the reconstructed digital video signal to determine the video quality of operation of the digital television receiver. The system and method of the present invention compares the digital video test pattern and the reconstructed digital video signal by 1) comparing the amount of jitter, and 2) comparing the signal to noise ratio, and 3) computing percentage similarity between an image block of each of the two video signals.

22 Claims, 4 Drawing Sheets

SYSTEM AND METHOD FOR AUTOMATED TESTING OF DIGITAL TELEVISION RECEIVERS

CROSS REFERENCE TO RELATED APPLICATIONS

The present invention is related to that disclosed in U.S. Provisional Patent Application No. 60/176,073 entitled "Automated Test System for Digital TV Receivers" filed Jan. 13, 2000 (the specification of the present invention claims priority to this provisional application under 35 U.S.C. §119(e)(1)). The provisional patent application and the inventions disclosed therein are assigned to the assignee of the present invention and are incorporated herein by reference for all purposes as if fully set forth herein.

TECHNICAL FIELD OF THE INVENTION

The present invention is directed, in general, to automated test systems and, more specifically, to a system for the automated testing of digital television receivers.

BACKGROUND OF THE INVENTION

In recent years significant efforts have been made to develop objective, quantitative techniques for measuring the quality of visual images. The algorithms that have resulted from these efforts have been primarily used to test the performance of image processing equipment and to analyze faults within the equipment. The specific technique utilized for analyzing the image quality of a particular system depends not only upon the characteristics of the image but also upon the technology used to generate the image.

While objective and quantitative image measurement techniques were evolving, new types of technology were also being developed to transfer digital images from a transmitting station, such as a television station, to one or more remotely located receiving stations, such as digital television receivers. These developments eventually resulted in the Advanced Television Systems Committee (ATSC) adopting voluntary standards for advanced television technology. The ATSC standard was accepted by the Federal Communications Commission (FCC) in November 1995. The ATSC standard became the basis for the United States digital television standard that was formally accepted in December 1996. The ATSC standard incorporates the Moving Pictures Experts Group (MPEG) compression scheme for full motion video with audio. Most current digital high definition television (HDTV) systems utilize the MPEG2 standard. Newer HDTV systems will use the MPEG4 standard in the future. MPEG2 and MPEG4 offer a wide range of compression ratios with varying degrees of audio and video quality.

The first broadcast of HDTV in the United States utilizing the ATSC standard occurred in November 1998. It is presently planned that all television broadcasts within the United States will use digital HDTV television signals by the year 2006. The evolution of HDTV has resulted in development of several new technologies for the encoding, transmission, reception, decoding and display of digital video images.

However, present manufacturing, testing and diagnostic techniques are not designed to adequately and objectively assess the quality of digital video images. The relatively recent development of digital television technology has created a demand for better and more efficient digital video image testing and diagnostic equipment.

There is therefore a need for a system and method for testing digital television receivers. In particular, there is a need for a system and method for an automated test system for digital television receivers. More particularly, there is a need in the art for an improved system and method for an automated test system for digital television receivers that provides an objective quantitative analysis of the quality of digital video images.

SUMMARY OF THE INVENTION

To address the above-discussed deficiencies of the prior art, it is a primary object of the present invention to provide an improved system and method for the automated testing of digital television receivers.

The system and method of the present invention comprises a digital video signal unit capable of sending an encoded digital video test pattern to a digital television receiver. The digital video signal unit is capable of receiving from the digital television receiver a decoded reconstructed digital video signal representing the digital video test pattern as displayed by the digital receiver television receiver.

The automated test system also comprises a test processing unit that is capable of comparing the digital video test pattern with the reconstructed digital video signal to determine the video quality of operation of the digital television receiver. The system and method of the present invention compares the digital video test pattern and the reconstructed digital video signal by 1) comparing the amount of jitter, and 2) comparing the signal to noise ratio, and 3) computing percentage similarity between image blocks for the two video signals.

It is an object of the present invention to provide an automated test system for digital television receivers capable of sending a digital video test pattern to a digital television receiver and capable of receiving a reconstructed digital video signal representing the digital video test pattern as displayed by the digital television receiver.

It is also an object of the present invention to provide an automated test system for digital television receivers capable of comparing a digital video test pattern with a reconstructed digital video signal to determine the video quality of operation of a digital television receiver.

It is another object of the present invention to provide an automated test system for digital television receivers capable of comparing the amount of jitter in a reconstructed digital video signal with a digital video test pattern to determine the video quality of operation of a digital television receiver.

It is still another object of the present invention to provide an automated test system for digital television receivers capable of comparing the signal to noise ratio in a reconstructed digital video signal with a digital video test pattern to determine the video quality of operation of a digital television receiver.

It is an additional object of the present invention to provide an automated test system for digital television receivers capable of computing percentage similarity between an image block in a reconstructed digital video signal and an image block in a digital video test pattern to determine the video quality of operation of a digital television receiver.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged configuration of an automated test system for digital television receivers.

Figure 1:
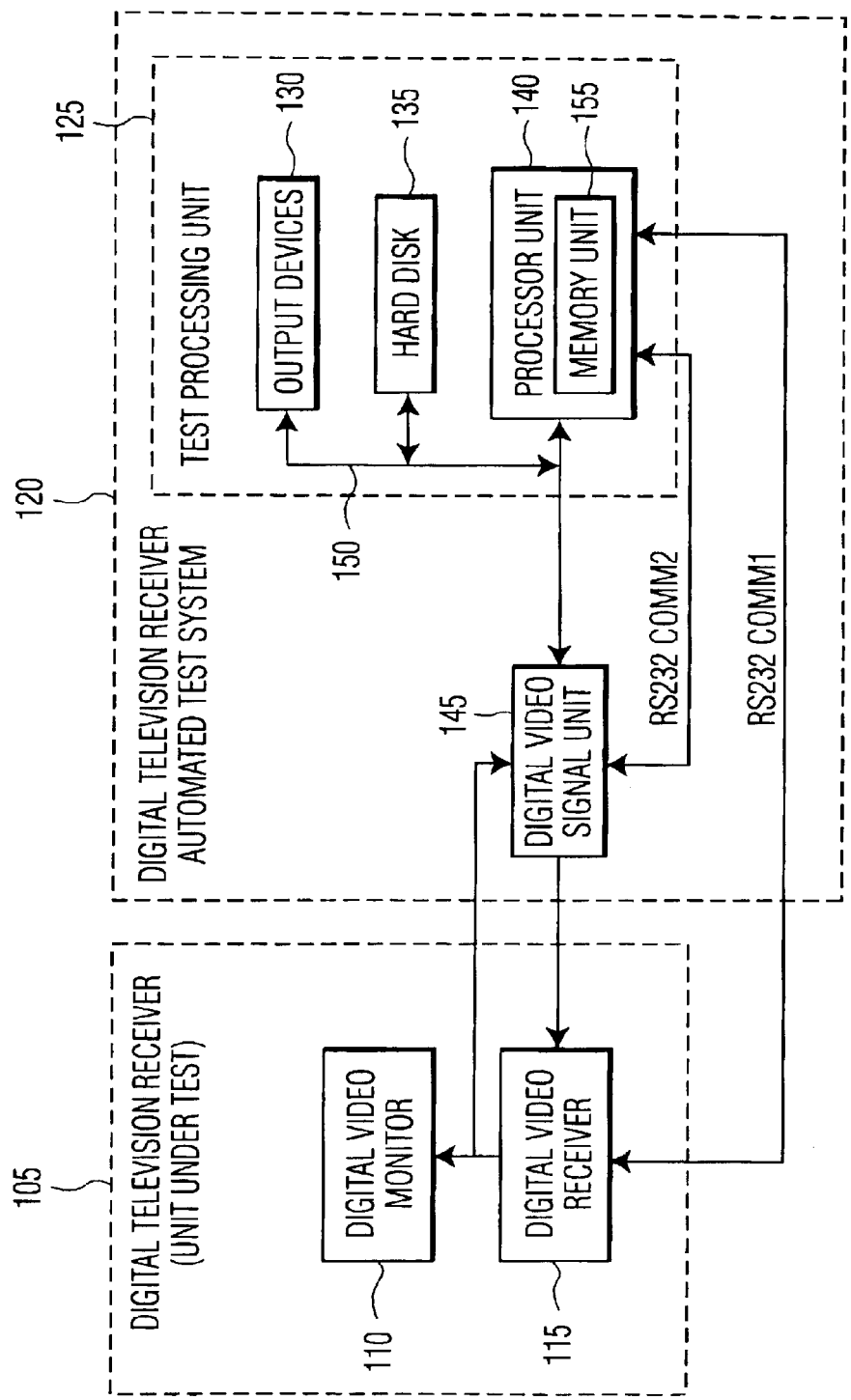
FIG. 1 illustrates a block diagram of an exemplary digital television receiver under test and an exemplary digital television receiver automated test system, according to one embodiment of the present invention.

FIG. 1 illustrates a block diagram of an exemplary digital television receiver 105 and a block diagram of an exemplary digital television receiver automated test system 120 (automated test system 120), according to one embodiment of the present invention. Digital television receiver 105 comprises digital video monitor 110 and digital video receiver 115. Digital television receiver 105 may sometimes be referred to as the Unit Under Test (UUT). As will be more fully explained, digital video receiver 115 receives digital video signals from automated test system 120. Digital video receiver 115 sends digital video signals to digital video monitor 110 and to automated test system 120. Digital video receiver 115 and automated test system 120 are also coupled by a first RS232 data communication line (RS232 COMM1). Digital television receiver 105 may also comprise additional circuits (not shown) for connecting to an external test system such as automated test system 120.

Automated test system 120 comprises test processing unit 125 and digital video signal unit 145. In one embodiment, test processing unit 125 comprises output devices 130, hard disk 135, and processor unit 140. As will be more fully explained, automated test system 120 also comprises software located within processor unit 140 or within hard disk 135 (where it is accessible by processor unit 140). Output devices 130 may include a high-quality laser printer that provides hard copy print-outs of the automated test results. Output devices 130 preferably include a printer that is capable of displaying and printing video test images. Output devices 130 may also include a video monitor or other similar computer display device. Hard disk 135 provides nonvolatile storage for software programs, test results, and other information related to the operation of automated test system 120.

Processor unit 140 is coupled to standard input devices such as a keyboard and a mouse (not shown). Processor unit 140 receives software program information from hard disk 135. Processor unit 140 contains memory unit 155 for storing data and software programs. Processor unit 140 also receives user input from the keyboard or mouse. Processor 140 operates with instructions from software programs (stored on hard disk 135 or in memory unit 155) and instructions from user input (from the keyboard or mouse). Processor unit 140 and the software in memory unit 155 (and on hard disk 135) together comprise a test processing unit that is capable of carrying out the present invention. As will be more fully explained, processor unit 140 generates video test patterns to analyze the video quality of operation of digital television receiver 105.

Digital video signal unit 145 operates under the direction of test processing unit 125 to create encoded video test patterns in the form of digitized video signals with red (R), green (G), and blue (B) components (RGB components) for transfer to digital television receiver 105. Digital video signal unit 145 also receives the resultant decoded RGB video signals from digital television receiver 105 and converts these signals and transfers them to test processing unit 125 as a reconstructed video test pattern. Digital video signal unit 145 and processor unit 140 are coupled by a second RS232 data communication line (RS232 COMM2) and by CPU bus 150. The operation of digital video signal unit 145 is described more fully below.

Figure 2:
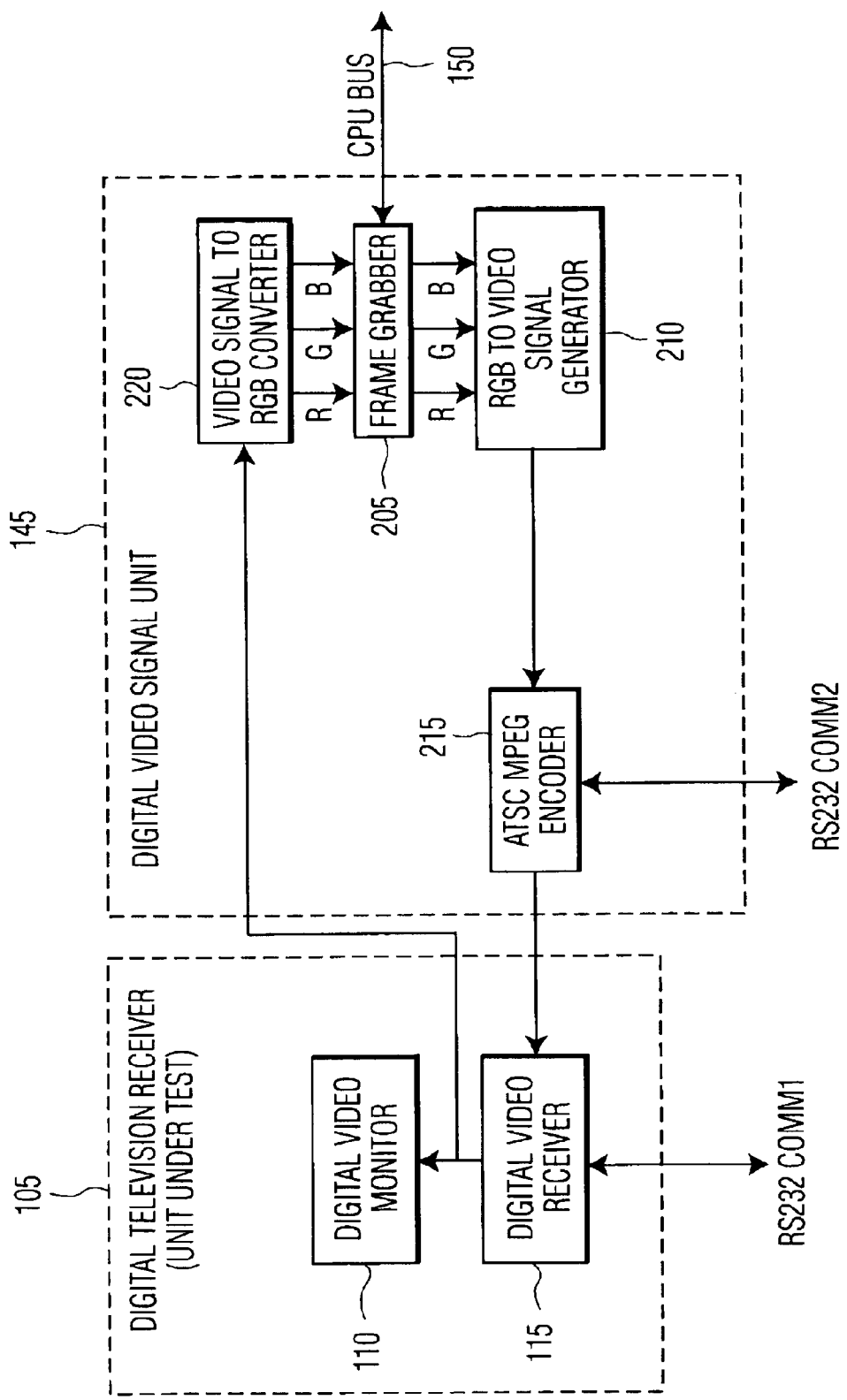
FIG. 2 illustrates a block diagram of a digital television receiver under test and an exemplary digital video signal unit, according to one embodiment of the present invention.

FIG. 2 illustrates a block diagram of an exemplary digital television receiver 105 and a block diagram of an exemplary digital video signal unit 145, according to one embodiment of the present invention. Digital video signal unit 145 comprises frame grabber 205, red-green-blue pixel (RGB pixel) to video signal generator 210, ATSC-MPEG encoder 215 (encoder 215), and video signal to red-green-blue pixel (RGB pixel) converter 220.

Frame grabber 205 receives a frame of the decoded video bit streams from digital television receiver 105 that represent the reconstructed video test pattern and transfers them to processor unit 140 (not shown in FIG. 2) through CPU bus 150. Frame grabber 205 also receives outgoing video bit streams from processor unit 140 through CPU bus 150. The outgoing video bit streams represent the original video test pattern. Frame grabber 205 transfers frames of the outgoing video bit streams to digital television receiver 105 through encoder 215. The outgoing video bit streams from processor unit 140 represent video test patterns sent to test the operational video quality of digital television receiver 105.

Frame grabber 205 uses well known techniques to detect a video bit stream that is associated with a test pattern video frame from processor unit 140. After frame grabber 205 detects a test pattern video frame from processor unit 140, frame grabber 205 isolates the red (R), green (G), and blue (B) pixel components of the detected test pattern video frame and provides the respective R, G, and B video data as input R, G, and B signals to RGB to video signal generator 210.

RGB to video signal generator 210 receives the test pattern R, G, and B signals from frame grabber 205 and uses well known techniques to convert these test pattern R, G, and B signals to analog signals for output to encoder 215.

Encoder 215 exchanges operational information with test processing unit 125 on second RS232 data communication line (RS232 COMM2). Encoder 215 operates under the direction of test processing unit 125. In one embodiment, encoder 215 may receive information from test processing unit 125 for compressing the video signal generated from the RGB to video signal generator 210. Encoder 215 may be controlled by test processing unit 125 on second RS232 data communication line.

Encoder 215 accepts analog video signals from RGB to video signal generator 210 and digitally compresses the signals according to a known compression algorithm such as ATSC-MPEG2. Encoder 215 then converts the compressed video frames to appropriate levels to simulate an incoming digital video signal of the type that digital television receiver 105 would normally receive from an antenna or cable (not shown). Encoder 215 then sends the resultant compressed video test pattern to digital video receiver 115.

As shown in FIG. 2, video signal to RGB converter 220 receives decoded video signals from digital television receiver 115. The decoded video signals are the same decoded video signals that digital television receiver 115 provides to digital video monitor 110. The decoded video signals represent the reconstructed video test pattern. In other words, video signal to RGB converter 220 receives video signals that reflect the video test pattern after it has been received and converted for display by digital television receiver 115. These signals will be referred to as the reconstructed video test pattern.

Video signal to RGB converter 220 uses well known techniques to convert the incoming reconstructed video signals to R, G, and B signals required for input to frame grabber 205. Frame grabber 205 accepts the R, G, and B signals that represent the reconstructed video signals. Frame grabber 205 formats the R, G, and B signals as video frames and transfers the video frames to test processing unit 125 on CPU bus 150. Test processing unit 125 then analyzes the video frames to compare the reconstructed video signals with the original video test pattern. In this manner, test processing unit 125 analyzes the operational video quality of digital television receiver 105.

Figure 3:
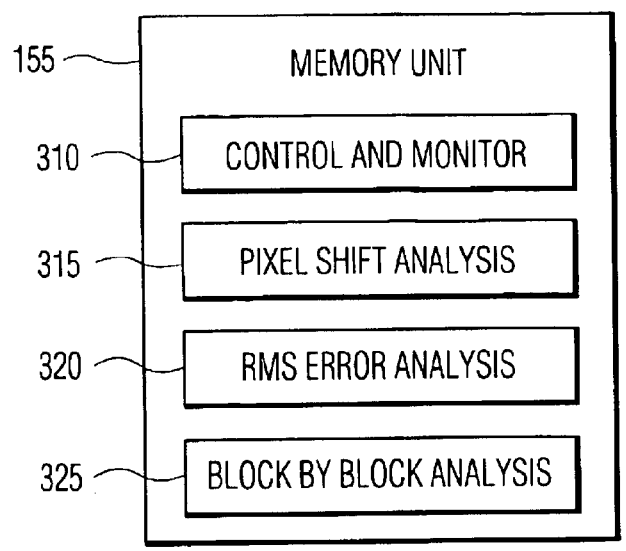
FIG. 3 illustrates a block diagram of an exemplary memory unit, according to one embodiment of the present invention.

FIG. 3 illustrates an exemplary memory unit 155 within processor unit 140, according to one embodiment of the present invention. Memory unit 155 stores data and programs associated with automated test system 120. Memory unit 155 may be a volatile memory device such as random access memory (RAM). Memory unit 155 contains software for control and monitor routines 310, software for pixel shift analysis 315, software for root mean square (RMS) error analysis 320, and software for block by block analysis 325. Control and monitor routines 310 direct the general interchange of communications on CPU bus 150, RS232 COMM1, and RS232 COMM2. Control and monitor routines 310 also coordinate the exchange of data between different locations in memory unit 155. Control and monitor routines 310 also provide the routines that prepare the test results of digital television receiver 105 for user display, printing, and storage as directed by the user and other program elements.

Pixel shift analysis 315 compares an digital video test pattern with the corresponding reconstructed digital video test pattern output by digital television receiver 105 to determine the image jitter that has been introduced by digital television receiver 105. Pixel shift analysis 315 accomplishes this comparison through the use of a pixel shift analysis algorithm (to be described more fully below). Pixel shift analysis 315 transfers the results of this comparison to control and monitor routines 310 as a quality measurement for the jitter associated with the reconstructed digital video test pattern displayed by digital television receiver 105.

RMS error analysis 320 determines the signal to noise ratio (SNR) of the original digital video test pattern and the signal to noise ratio of the reconstructed digital video test pattern as output by digital television receiver 105. RMS error analysis 320 calculates the root mean square error (RSME) between the two images and provides the result as a measurement of the signal to noise ratio (SNR) that is transferred to control and monitor routines 310. RMS error analysis 320 calculates the signal to noise ratio (SNR) as follows:

$$SNR = 20 \log_{10}(1/(RSME)) \quad (1)$$

where RSME is the root-mean-square error:

$$RSME = (3^{-1/2})(N^{-1} X_{max}^{-1})[(\textstyle\sum_{i=1}^{N})(\textstyle\sum_{j=1}^{N})(X_{ij} - X_{ij}\hat{\,})^2]^{1/2} \quad (2)$$

and where N is the image dimension, $X_{ij}$ is the amplitude of an arbitrary original input element, $X_{ij}\hat{\,}$ is the amplitude of the reconstructed input element, and $X_{max}$ is the maximum amplitude of the input element.

The root-mean-square error (RSME) between the original digital video test pattern and the reconstructed digital video test pattern for each color component and for each luminance component can be calculated in a similar manner after converting each pixel of the RGB color images into their corresponding components in the luminance-chrominance domain for the video signal.

Block by block analysis 325 compares the original digital video test pattern and the reconstructed digital video test pattern image using a minimum distance algorithm for image similarity. The minimum distance algorithm for image similarity computes the similarity between the two images as a function of the distance between the images with respect to the distance between the original video test pattern image block and its most distorted possible replica.

The similarity factor for a block of the original digital video test pattern and a block of the reconstructed digital video test pattern is computed as follows:

$$S = 1 - (d/d_{max}) \quad (3)$$

In Equation (3) the value d is the Euclidean distance between the original and the reconstructed video test pattern image blocks. The value of d is calculated by:

$$d = (\Sigma_i \Sigma_j (X_{ij} - X_{ij}^\wedge)^2)^{1/2} \quad (4)$$

where $X_{ij}$ is the amplitude of an arbitrary input element of the input image, and $X_{ij}^\wedge$ is the amplitude of the reconstructed input element that is the counterpart of $X_{ij}$.

In equation (3) the value $d_{max}$ is the distance between the input image block and the most distant image block. The value of $d_{max}$ is calculated by:

$$d_{max} = (\Sigma_i \Sigma_j (X_{ij} - X_{dij})^2)^{1/2} \quad (5)$$

where $X_{ij}$ is the amplitude of an arbitrary input element of the input image and $X_{dij}$ is the amplitude of the reconstructed input element that is the most distant counterpart of $X_{ij}$.

Figure 4:
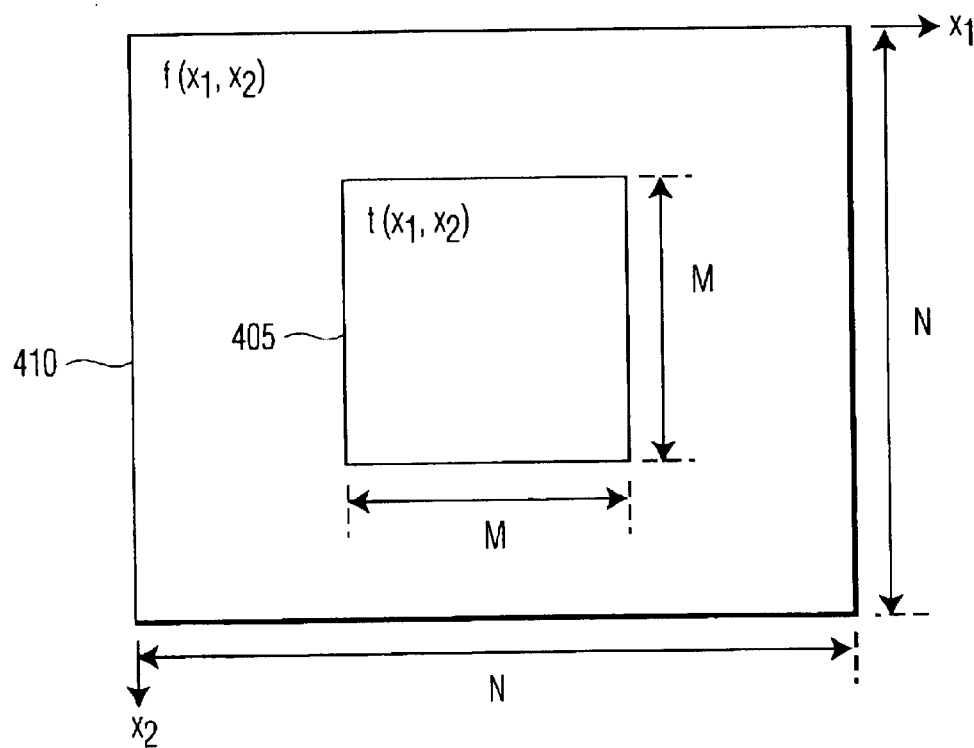
FIG. 4 illustrates a portion of an original digital video test pattern and a portion of a reconstructed digital video test pattern for illustrating an exemplary pixel shift analysis, according to one embodiment of the present invention.

As previously mentioned, pixel shift analysis 315 compares the original digital video test pattern with the reconstructed digital video test pattern to determine the amount of image jitter that has been introduced by digital television receiver 105. FIG. 4 illustrates a portion 405 of an original digital video test pattern and a portion 410 of the reconstructed digital video test pattern that corresponds to portion 405. The differences between portion 405 and portion 410 in FIG. 4 are exaggerated for clarity. The horizontal axis for comparison of the two portions, 405 and 410, is labeled $X_1$ and the vertical axis is labeled $X_2$. In this embodiment, portion 405 is a frame that covers an M pixel by M pixel surface area. Portion 410 is a frame that covers an N pixel by N pixel surface area. The function $t(X_1, X_2)$ represents the pixel pattern within portion 405. The function $f(X_1, X_2)$ represents the pixel pattern within portion 410.

A pixel shift analysis algorithm is used to determine the amount of image jitter between portion 405 and portion 410. The algorithm calculates the sum of the differences of function $t(X_1, X_2)$ and function $f(X_1, X_2)$ of the two portions, 405 and 410, as follows:

$$S_{ft}(Y_1, Y_2) = \Sigma_{X1} \Sigma_{X2} |f(X_1, X_2) - t(X_1 - Y_1, X_2 - Y_2)| \quad (6)$$

where $Y_1$ is the amount of shift along the x axis and where $Y_2$ is the amount of shift along the y axis. When $S_{ft}(Y_1, Y_2)$ equals zero, there is an exact match between the original digital video test pattern and the reconstructed digital video test pattern. That is, when $S_{ft}(Y_1, Y_2)$ equals zero, there is zero jitter.

Figure 5:
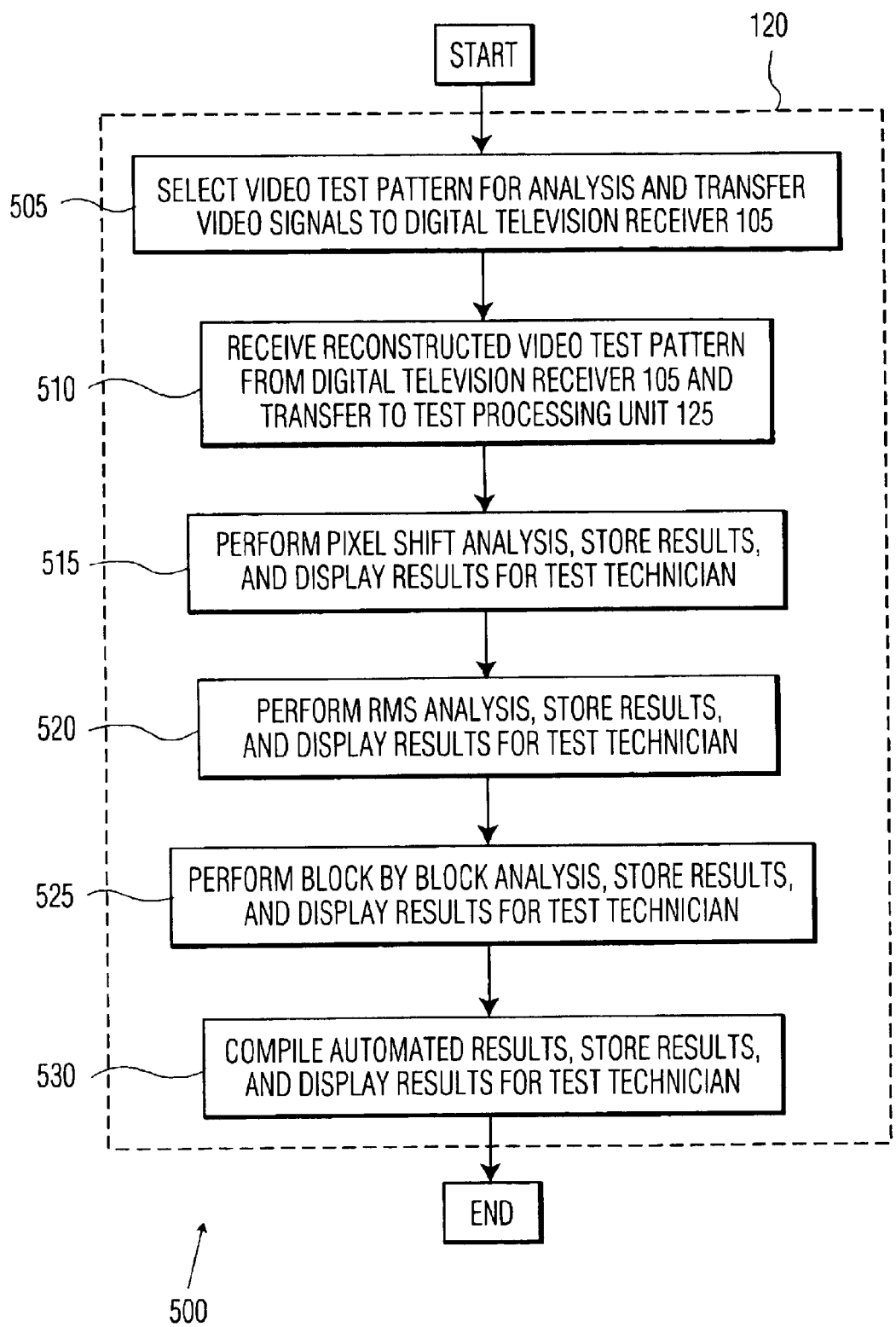
FIG. 5 illustrates a flow chart depicting the operation of an exemplary automated test system for digital television receivers, according to one embodiment of the present invention.

FIG. 5 illustrates a flow chart 500 depicting the operation of automated test system 120, according to one embodiment of the present invention. First, automated test system 120 selects an original digital video test pattern to analyze the operation of digital television receiver 105. Digital video signal unit 145 generates video signals representing the selected original digital video test pattern and transfers the resultant video signals to digital television receiver 105 (process step 505).

Digital video signal unit 145 receives video signals representing the reconstructed digital video test pattern from digital television receiver 105. Digital video signal unit 145 converts the video signals of the reconstructed digital video test pattern to RGB signals and transfers the resultant video frames to test processing unit 125 for further processing (process step 510).

Test processing unit 125 performs a pixel shift analysis on the reconstructed digital video test pattern, stores the results in memory unit 155 for later retrieval, and displays the results for further evaluation by the test technician (process step 515).

In a similar manner, test processing unit 125 then performs a root-mean-square (RMS) analysis of the original and reconstructed digital video test patterns, stores the results in memory unit 155 for later retrieval, and displays the results for further evaluation by the test technician (process step 520).

Then test processing unit 125 performs a block by block analysis of the original and reconstructed digital video test patterns, stores the results in memory unit 155 for later retrieval, and displays the results for further evaluation by the test technician (process step 525).

Test processing unit 125 then compiles the automated test results, stores the automated test results in memory unit 155 for later retrieval, and displays the compiled results for evaluation by the test technician (process step 530).

In an alternate embodiment, automated test system 120 may further automatically evaluate a digital television receiver 105 using any one of (or any combination of) the pixel shift analysis, the RMS analysis, and the block by block analysis according to difference limits that have been pre-selected as acceptable deviation limits for a particular digital television receiver 105 under test. Automated test system 120 may subsequently generate analysis reports that indicate the amount of deviation, if any, from the acceptable deviation limits.

In an alternate embodiment, automated test system 120 may further incorporate suggested corrective actions when digital television receiver 105 deviates beyond a particular range for one or more of the automated tests.

In another embodiment, automated test system 120 may have a multitude of digital video test patterns that are selected based upon the particular test being performed and a range of acceptable test results. For instance, automated test system 120 may use a single pre-determined initial digital video test pattern to acquire an initial performance analysis for each of the three characteristics being tested (jitter, signal to noise ratio, and block errors). Depending upon the performance of digital television receiver 105, automated test system 120 may then select one or more additional digital video test patterns for re-analysis according to whether the initial test results appear to be out of the desired range.

In another embodiment, automated test system 120 may have one or more digital video test patterns that are specifically dedicated to a particular automated test. That is, there may be one or more digital video test patterns that are used only with one type of automated test.

Although the present invention has been described in detail, those skilled in the art should understand that they can make various changes, substitutions and alterations herein without departing from the spirit and scope of the invention in its broadest form.

What is claimed is:

1. An automated test system for testing a digital television receiver, said automated test system capable of sending a digital video test pattern to said digital television receiver, and capable of receiving from said digital television receiver a reconstructed digital video signal representing said digital video test pattern as displayed by said digital television receiver.

2. The automated test system as set forth in claim 1, said automated test system capable of comparing said digital video test pattern with said reconstructed digital video signal to determine the video quality of operation of said digital television receiver.

3. The automated test system as set forth in claim 2 where said automated test system is capable of comparing the amount of jitter in said reconstructed digital video signal with said digital video test pattern.

4. The automated test system as set forth in claim 2 where said automated test system is capable of comparing the signal to noise ratio in said reconstructed digital video signal with said digital video test pattern.

5. The automated test system as set forth in claim 2 where said automated test system is capable of computing percentage similarity between an image block in said reconstructed digital video signal and an image block in said digital video test pattern.

6. An automated test system for testing a digital television receiver, said automated test system comprising:
    a digital video signal unit capable of sending a digital video test pattern to said digital television receiver, and capable of receiving from said digital television receiver a reconstructed digital video signal representing said digital video test pattern as displayed by said digital television receiver; and
    a test processing unit coupled to said digital video signal unit, said test processing unit capable of comparing said digital video test pattern with said reconstructed digital video signal to determine the video quality of operation of said digital television receiver.

7. The automated test system as set forth in claim 6 wherein said digital video signal unit comprises:
    a frame grabber coupled to said test processing unit, said frame grabber capable of receiving a video test pattern signal from said test processing unit and capable of isolating red, green and blue (RGB) pixel components from said video test pattern signal;
    an RGB to video signal generator coupled to said frame grabber, said RGB to video signal generator capable of receiving said red, green and blue (RGB) pixel components from said frame grabber, and capable of generating a video signal that represents said video test pattern signal; and
    an encoder coupled to said RGB to video signal generator, said encoder capable of receiving said video signal and forming a digital video bit stream into digital video frames, and capable of compressing said digital video frames into a compressed digital video signal test pattern, and capable of sending said compressed digital video signal test pattern to said digital television receiver.

8. The automated test system as set forth in claim 7 wherein said digital video signal unit further comprises:
    a video signal to RGB converter coupled to said frame grabber, said video signal to RGB converter capable of receiving decoded digital video signals from said digital television receiver, and capable of converting said decoded digital video signals to red, green and blue (RGB) pixel components, and capable of sending said red, green and blue (RGB) pixel components to said frame grabber; and wherein
    said frame grabber is capable of converting said red, green and blue (RGB) pixel components to video frames, and is capable of sending said video frames to said test processing unit.

9. The automated test system as set forth in claim 6 wherein said test processing unit comprises a processor unit capable of comparing the amount of jitter in said reconstructed digital video signal with said digital video test pattern.

10. The automated test system as set forth in claim 6 wherein said test processing unit comprises a processor unit capable of comparing the signal to noise ratio in said reconstructed digital video signal with said digital video test pattern.

11. The automated test system as set forth in claim 6 wherein said test processing unit comprises a processor unit capable of computing percentage similarity between an image block in said reconstructed digital video signal and an image block in said digital video test pattern.

12. The automated test system as set forth in claim 6 wherein said test processing unit comprises a processor unit capable of 1) comparing the amount of jitter in said reconstructed digital video signal with said digital video test pattern, and 2) comparing the signal to noise ratio in said reconstructed digital video signal with said digital video test pattern, and 3) computing percentage similarity between an image block in said reconstructed digital video signal and an image block in said digital video test pattern.

13. A method for testing a digital television receiver, said method comprising the steps of:
    sending a digital video test pattern to said digital television receiver;
    receiving from said digital television receiver a reconstructed digital video signal representing said digital video test pattern as displayed by said digital television receiver; and
    comparing said digital video test pattern with said reconstructed digital video signal to determine the video quality of operation of said digital television receiver.

14. The method as set forth in claim 13, wherein the step of comparing said digital video test pattern with said reconstructed digital video signal to determine the video quality of operation of said digital television receiver comprises:
    comparing the amount of jitter in said reconstructed digital video signal with said digital video test pattern.

15. The method as set forth in claim 13, wherein the step of comparing said digital video test pattern with said reconstructed digital video signal to determine the video quality of operation of said digital television receiver comprises:
    comparing the signal to noise ratio in said reconstructed digital video signal with said digital video test pattern.

16. The method as set forth in claim 13, wherein the step of comparing said digital video test pattern with said reconstructed digital video signal to determine the video quality of operation of said digital television receiver comprises:
    computing percentage similarity between an image block in said reconstructed digital video signal and an image block in said digital video test pattern.

17. The method as set forth in claim 13, wherein the step of comparing said digital video test pattern with said reconstructed digital video signal to determine the video quality of operation of said digital television receiver comprises the steps of:
    comparing the amount of jitter in said reconstructed digital video signal with said digital video test pattern;
    comparing the signal to noise ratio in said reconstructed digital video signal with said digital video test pattern; and
    computing percentage similarity between an image block in said reconstructed digital video signal and an image block in said digital video test pattern.

18. For use in an automated test system, computer-executable instructions stored on a computer-readable storage medium for testing a digital television receiver, the computer-executable instructions comprising the steps of:

sending a digital video test pattern to said digital television receiver;

receiving from said digital television receiver a reconstructed digital video signal representing said digital video test pattern as displayed by said digital television receiver; and comparing said digital video test pattern with said reconstructed digital video signal to determine the video quality of operation of said digital television receiver.

19. The computer-executable instructions stored on a computer-readable storage medium as set forth in claim 18 wherein the step of comparing said digital video test pattern with said reconstructed digital video signal to determine the video quality of operation of said digital television receiver comprises:

comparing the amount of jitter in said reconstructed digital video signal with said digital video test pattern.

20. The computer-executable instructions stored on a computer-readable storage medium as set forth in claim 18 wherein the step of comparing said digital video test pattern with said reconstructed digital video signal to determine the video quality of operation of said digital television receiver comprises:

comparing the signal to noise ratio in said reconstructed digital video signal with said digital video test pattern.

21. The computer-executable instructions stored on a computer-readable storage medium as set forth in claim 18 wherein the step of comparing said digital video test pattern with said reconstructed digital video signal to determine the video quality of operation of said digital television receiver comprises:

computing percentage similarity between an image block in said reconstructed digital video signal and an image block in said digital video test pattern.

22. The computer-executable instructions stored on a computer-readable storage medium as set forth in claim 18 wherein the step of comparing said digital video test pattern with said reconstructed digital video signal to determine the video quality of operation of said digital television receiver comprises the steps of:

comparing the amount of jitter in said reconstructed digital video signal with said digital video test pattern;

comparing the signal to noise ratio in said reconstructed digital video signal with said digital video test pattern; and computing percentage similarity between an image block in said reconstructed digital video signal and an image block in said digital video test pattern.

* * * * *